Sept. 3, 1946.  G. O. COATES  2,406,995
ANTISKID CHAIN
Filed April 7, 1942
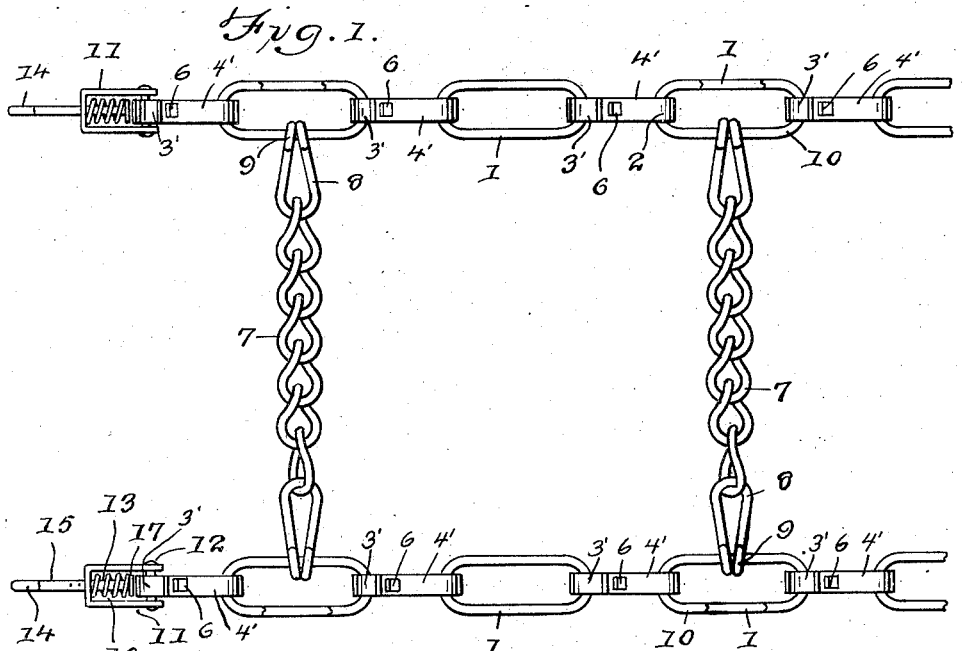
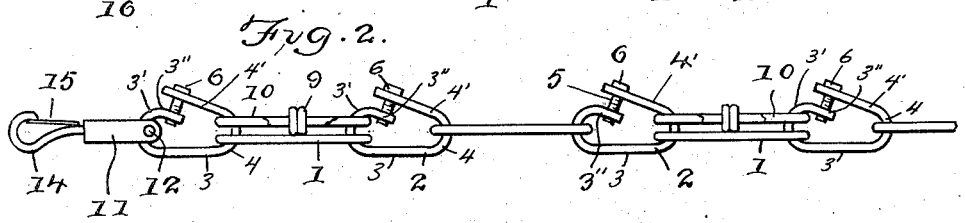
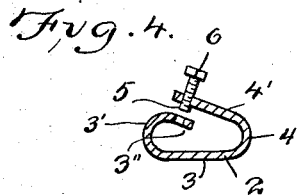
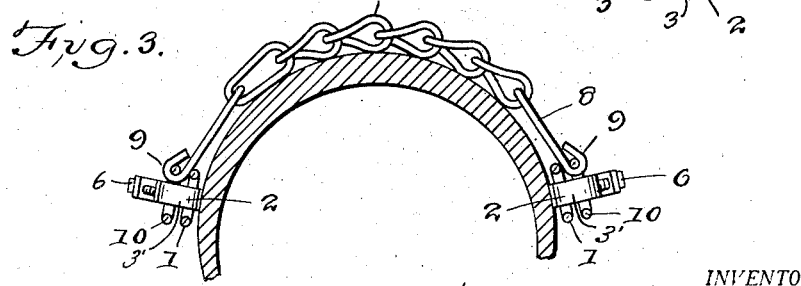
INVENTOR.
George O. Coates
BY
Victor J. Evans & Co.
ATTORNEYS Patented Sept. 3, 1946

2,406,995

UNITED STATES PATENT OFFICE 2,406,995

ANTISKID CHAIN

George O. Coates, Washington, D. C.

Application April 7, 1942, Serial No. 438,042

2 Claims. (Cl. 59—85)

This invention relates to antiskid chains for vehicle tires, and its general object is to provide a chain of the tire encircling type, which makes it possible to renew damaged or broken cross chains in an easy and expeditious manner, without removing the chains from the tire, and the length of said chain can be readily varied, without the use of special tools, to fit tires of various sizes.

A further object is to provide a tire chain of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like character denote like or corresponding parts throughout the several views, and in which:

Figure 1 is a top plan view illustrating the end portion of my chain, having the fastening elements connected thereto, for securing the chain to the tire, and illustrates certain links of the cross chains broken away.

Figure 2 is a side view of Figure 1.

Figure 3 is a transverse sectional view, illustrating my chain applied to a tire.

Figure 4 is a longitudinal sectional view taken through one of the open links, with the screw bolt in open position.

Referring to the drawing in detail, it will be noted that the side chains are each made up of alternately arranged elongated continuous links 1 and transversely split open links 2, the latter, each being formed from strip metal looped to provide an arcuate end portion 4 a straight side leg 3 extending from the arcuate portion 4, a second arcuate portion 3′ formed at the opposite end of the side leg 3, a second leg 4′ extending outwardly from that end of the portion 4 opposite leg 3 and in the direction of portion 3′ a third straight leg 3″ extending inwardly from the end of the arcuate portion 3′ opposite leg 3 in the direction of portion 4. The legs 3″ and 4′ having their free ends fixedly disposed to form a space therebetween. The space between the end portions provides an opening 5 that is normally closed by a headed screw bolt 6 threaded or slidably mounted through a hole in the outer end portion, but in any event is threaded through a hole in the inner end portion 3, for disposal in bridging relation to the said portions. The heads of the bolts are flat sided to facilitate turning the same by pliers, and they may be kerfed for receiving a screw driver.

Each of the cross chains include connected intermediate links 7 of the usual twisted ground engaging type in the form shown, and connecting to each of the end links 7 is a link 8 of the usual looped type having hooked outer ends 9, arranged about an elongated continuous link 10 to connect the latter thereto and for disposal at right angles to the length thereof, as best shown in Figure 1. The links 10 which are identical to the links 1 of the side chains, are connected to adjacent open links 2 for disposal in parallelism with the links 1, to be arranged along the length of the side chains.

Open links 2 are arranged at one of the adjacent ends of the side chains as shown, while continuous links 1 are arranged at the opposite adjacent ends, not shown, and connected to the end open links are spring hook or safety fasteners for detachable connection to the end continuous links 1 to secure the chain about the tire, as will be apparent. The fasteners each include a substantially U-shaped attaching member 11 having a headed pin 12 bridging the outer ends of the arms thereof and mounted in the end open links for connecting the fasteners thereto. Slidably mounted through the bight portion of the U-shaped member 11 is a shank 13 of a hook 14, the shank having secured thereto, a spring tongue 15 normally bearing against the inner face of the outer end of the hook, as best shown in Figure 2. Sleeved on the shank 13 is a spiral spring 16 that bears against the inner face of the bight portion and an annular abutment flange 17 on the inner or free end of the shank, for urging the hook in retracted position. The inner end of the shank may be threaded, with a nut or a washer thereon, for the washer to provide an abutment for the spring 16.

From the above description and disclosure in the drawing, it will be obvious that in the event it becomes necessary to renew a cross chain, such can be accomplished without removing the antiskid chain from the tire, as the side chains remain intact, when a cross chain is removed therefrom. In removing a cross chain, the bolts 6 are first removed or threaded to the open position of Figure 4, the links 10 are then removed, and the new cross chain is attached in place and held accordingly by the bolts. It will be further obvious that the spring pressed fasteners not only allow the side chains to give, so as to bring about ready removal and application of the cross chains, but hold the side chains taut about the tire, thus eliminating the use of spring and elastic devices now generally employed, for that purpose.

The open links also make it possible to readily vary the length of the side chains, to fit tires of various sizes, as it will be apparent that the number of links of the side chains can be increased or decreased without the use of special tools.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A chain link comprising a strip of flat metal bent to form a first arcuate end portion, a straight side leg extending from said arcuate portion, a second arcuate portion formed at the opposite end of said leg, a second relatively short straight leg extending outwardly from that end of the first arcuate portion opposite the first leg and in the direction of the second arcuate potrion, a third straight leg extending inwardly from that end of the second arcuate portion opposite the first leg in the direction of the first arcuate portion, said second and third legs having their free ends fixedly disposed in overlapping transversely spaced parallel relation to provide a gap therebetween, the respective overlapping parallel ends having aligned openings therein, and a fastening element removably extending through said openings to bridge the gap.

2. A chain link comprising a strip of flat metal bent to form a first arcuate end portion, a straight side leg extending from said arcuate portion, a second arcuate portion formed at the opposite end of said leg, a second relatively short straight leg extending from that end of the first arcuate portion opposite the first leg and in the direction of the second arcuate portion, a third straight leg extending from that end of the second arcuate portion opposite the first leg in the direction of the first arcuate portion, said second and third legs having their free ends fixedly disposed in overlapping transversely spaced parallel relation to provide a gap therebetween, the respective second and third legs and their overlapping portions being disposed at an oblique inclination with relation to the first leg and parallel thereto and having aligned openings in said end portions, and a threaded bolt having threaded connection with the said openings for removably bridging said gap.

GEORGE O. COATES.